(12) United States Patent
Kito et al.

(10) Patent No.: US 8,720,472 B2
(45) Date of Patent: May 13, 2014

(54) FUEL CUTOFF VALVE

(75) Inventors: Hiroaki Kito, Kiyosu (JP); Kenichiro Kaneko, Kiyosu (JP); Kenta Kuwayama, Kiyosu (JP); Toru Matsuzaki, Sakura (JP); Kazunari Nakaya, Sakura (JP)

(73) Assignees: Toyoda Gosei Co., Ltd., Aichi-pref. (JP); Yachiyo Industry Co., Ltd., Sayama-shi (JP)

( * ) Notice: Subject to any disclaimer, the term of this patent is extended or adjusted under 35 U.S.C. 154(b) by 121 days.

(21) Appl. No.: 13/557,296

(22) Filed: Jul. 25, 2012

(65) Prior Publication Data

US 2013/0025700 A1 Jan. 31, 2013

(30) Foreign Application Priority Data

Jul. 27, 2011 (JP) .................................. 2011-163890

(51) Int. Cl.
*F16K 24/04* (2006.01)
*B60K 15/035* (2006.01)

(52) U.S. Cl.
USPC .......................................... 137/202; 251/127

(58) Field of Classification Search
USPC ..................... 137/202, 41; 251/127
See application file for complete search history.

(56) References Cited

U.S. PATENT DOCUMENTS

| 6,035,884 | A | * | 3/2000 | King et al. | 137/202 |
| 6,425,379 | B2 | * | 7/2002 | Shimamura et al. | 123/516 |
| 6,843,268 | B2 | * | 1/2005 | Yamada et al. | 137/202 |
| 7,770,594 | B2 | * | 8/2010 | Kishi | 137/202 |
| 8,042,564 | B2 | * | 10/2011 | Ando et al. | 137/202 |
| 8,360,089 | B2 | * | 1/2013 | Hirata | 137/202 |
| 2009/0178719 | A1 | | 7/2009 | Matsuo | |

FOREIGN PATENT DOCUMENTS

| JP | 11-62725 A | 3/1999 |
| JP | 2009-168045 A | 7/2009 |

* cited by examiner

*Primary Examiner* — Craig Schneider
(74) *Attorney, Agent, or Firm* — Posz Law Group, PLC

(57) ABSTRACT

A fuel cutoff valve comprises a casing main body with a connecting hole and a valve chamber, a cover forming the tube member, and the float housed in the valve chamber. The valve comprises, above the casing main body, the liquid closure member forming the retaining chamber for temporarily retaining liquid fuel flown out of the connecting hole and the partition member formed in plurality in a ridge form on the upper surface of the upper wall within the retaining chamber. Each partition member is arranged radially so as to be connected to the liquid closure member from the near center of the connecting hole, and configured in such a way that the retaining chamber is divided into multiple divided chambers.

12 Claims, 8 Drawing Sheets

FUEL CUTOFF VALVE

This application claims the benefit of and priority from Japanese Application No. 2011-163890 filed Jul. 27, 2011, the content of which is incorporated herein by reference.

BACKGROUND OF THE INVENTION

1. Field of the Invention

The present invention relates to a fuel cutoff valve for cutting a passage between the interior and exterior of a fuel tank, especially to a passage structure leading to the outside.

2. Description of the Related Art

A fuel cutoff valve is disclosed in JP-2009-168045A. The fuel cutoff valve is installed on the upper portion of a fuel tank. The fuel cutoff valve comprises a cylindrical housing main body having an opening in the upper portion thereof, a float housed in a valve chamber of the housing, and a top cover that covers the upper portion of the housing main body forming an upper chamber with an exhaust port protruding out for connecting to the canister side. The fuel cutoff valve secures air vent of the fuel tank to outside by opening and closing the opening of the housing by the up-down movement of the float, and prevents fuel in the fuel tank from flowing out.

The opening of the housing main body is surrounded by the partition wall protruding from the upper surface of the housing main body. A cutout portion is cut out in the partition walls in the direction opposite to the exhaust port, thus securing the air vent to the exhaust port. This configuration prevents liquid fuel flown out of the opening from directing toward the exhaust port by the partition wall, allows it to remain in the upper space even if liquid fuel flows out from the cutout portion, and prevents it from flowing directly to the exhaust port.

However, in the fuel cutoff valve, the liquid fuel once entered into the upper space is hard to return to the valve chamber via the cutout portion and the opening. For this reason, there was a problem that fuel remaining in the upper space is likely to flow out to the canister via the exhaust port due to vehicular vibration.

SUMMARY

An advantage of some aspects of the invention is to provide a fuel cutoff valve that return liquid fuel, even if the liquid fuel flows out from the valve chamber via a connecting passage so that fuel is prevented from flowing outside, with a simple configuration.

According to an aspect of the invention, there is a fuel cutoff valve that opens and closes a passage connecting an interior and exterior of a fuel tank. The fuel cutoff valve comprises; a casing main body that has an upper wall, a side wall projecting cylindrically and downwardly from an outer periphery of the upper wall, a valve chamber surrounded by the upper wall and the side wall and connected to the interior of the fuel tank, and a connecting hole formed in the wall and connected to the valve chamber, a cover that has a cover main body forming a communication chamber connected to the connecting hole by being fixed to an upper portion of the casing main body, and a tube member projecting from the cover main body with a pipe passage for connecting the exterior and the communication chamber, and a float that is housed in the valve chamber that opens and closes the connecting hole by moving up and down following a fuel liquid level within the fuel tank. The casing main body includes; a liquid closure member that projects upwardly from the upper wall in the communication chamber to surround all around the connecting hole, the liquid closure member being configured to form a retaining chamber for temporarily retaining liquid fuel flown out of the connecting hole, and partition members that projects from the upper wall in the retaining chamber, wherein each of the partition member is arranged radially extending outward from a periphery of the connecting hole and to divide the retaining chamber into a plurality of divided chambers, and each opening of the divided chambers is configured to be arranged facing to the connecting hole.

In the fuel tank using the fuel cutoff valve, air vent to outside is secured via the valve chamber, a connecting hole, and the connecting passage within a communication chamber as well as a pipe passage, by opening and closing the opening of the housing by the up-down movement of the float following the change in fluid level of the fuel tank due to refueling, for example, so that fuel is prevented from flowing out.

Also, when fuel leaks out of the connecting hole due to undulation of fuel or delayed action of the float caused by refueling or pitching back and forth of the vehicle, the leaked fuel is guided to a retaining chamber formed by liquid closure members. In this case, since the retaining chamber is divided by partition members, the leaked fuel is guided to the retaining chamber divided by the partition members via the connecting hole. Fuel in the retaining chamber, when affected by the vehicular vibration, reduces its flowing speed by hitting the partition members to decrease the flowing force toward the pipe passage. Therefore, fuel remains in the retaining chamber and hardly flows out to outside via the pipe passage. Then, when the inclination of the vehicle returns back to a horizontal position, fuel in the retaining chamber is guided to the connecting hole along the partition members and brought back to the fuel tank through the connecting hole. Therefore, even when undulation of fuel or delayed action of the float mechanism occurs, it is possible to prevent fuel flown out of the connecting hole from directing toward the canister via the pipe passage.

In Application Example, the outer periphery of the partition member can be configured to be connected to walls of the liquid closure member. This configuration allows fuel to be quickly guided to the connecting hole from the retaining chamber without being guided to the pipe passage along the walls of the liquid closure member.

In Application Example, the partition member is formed at a lower height than the liquid closure member in the vertical direction, above which part of the communication chamber for letting gas flow between the connecting hole and the pipe passage can be configured. This configuration allows the gas flow to move to the pipe passage side via the communication chamber above the partition member. Therefore, the gas flown out of the connecting hole further flows quickly to the pipe passage without sustaining significant pressure loss due to the partition member.

In Application Example, the partition member can be configured to protrude from the upper surface of the upper wall at a location a determined distance away from the periphery of the opening of the connecting hole in the radial direction. This configuration allows the gas flown out of the connecting hole to quickly flow into the pipe passage without generating significant turbulence, because there is no partition member around the connecting hole.

In Application Example, the liquid closure member can take a configuration comprising an arc portion formed to partially surround the periphery of the opening of the connecting hole at a location facing the pipe passage, an outer side partition wall with a lager diameter than that of the arc portion, and a passage side partition wall that connects each end of the arc portion to the outer side partition wall. This configuration allows gas flow to be quickly guided into the pipe passage since the arc portion provides a passage in an arc form toward the pipe passage, reducing the pressure loss of gas flow. Since the passage side partition walls are formed opposing to the tube member, they can surely prevent liquid fuel from flowing out to the pipe passage.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
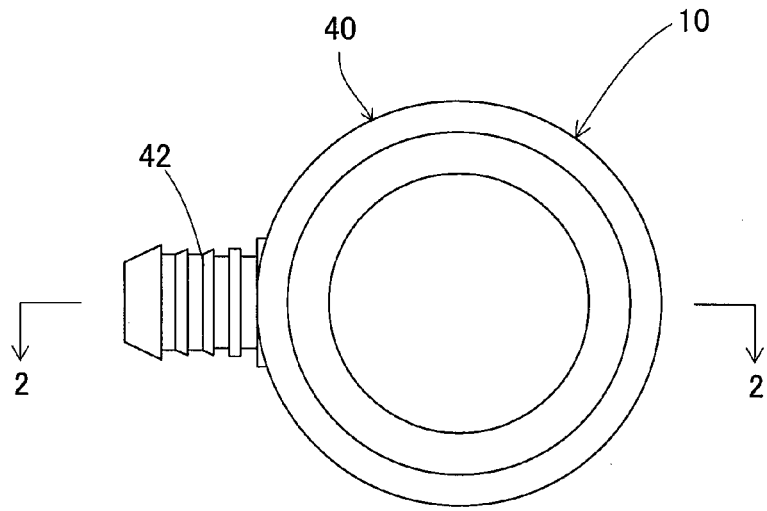
FIG. 1 is a plan showing a fuel cutoff valve according to an embodiment of the present invention.
Figure 2:
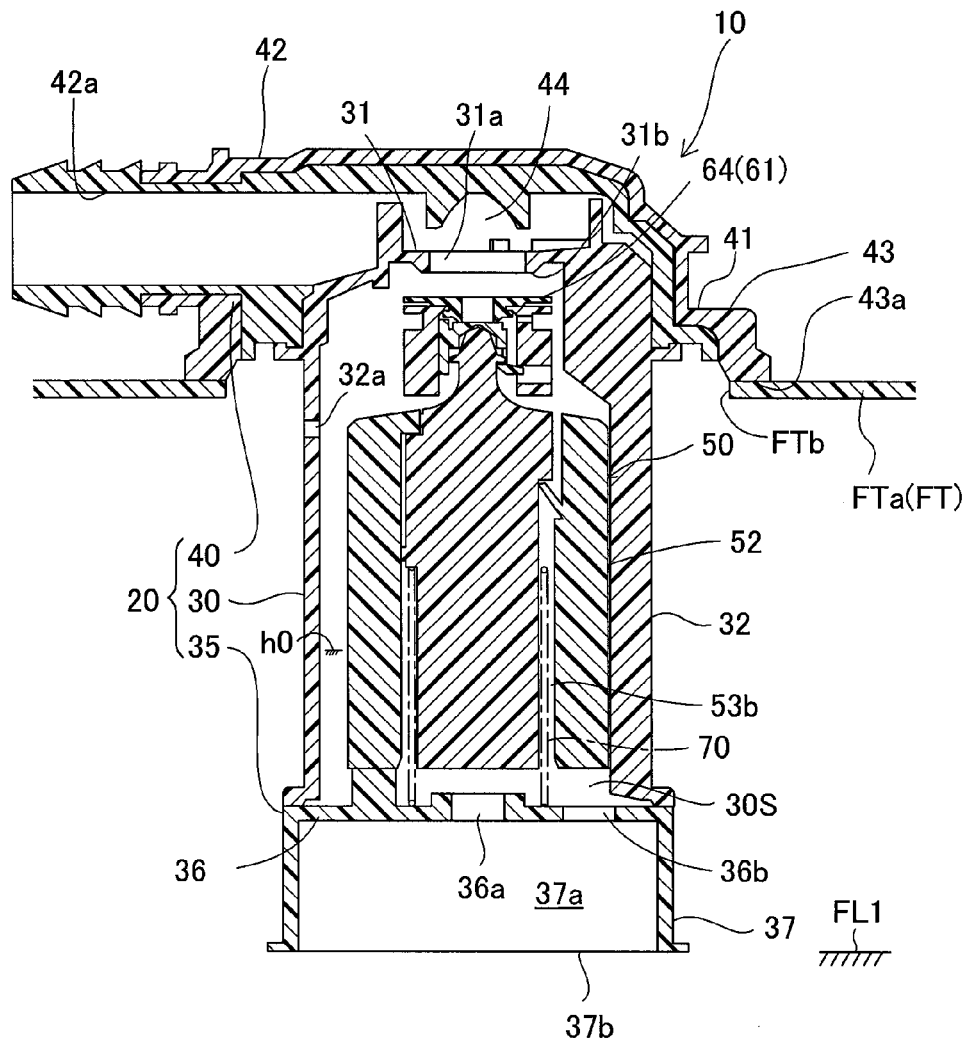
FIG. 2 is a cross section along the line 2-2 in FIG. 1.

FIG. 1 is a plan showing a fuel cutoff valve 10 according to an embodiment of the present invention, and FIG. 2 is a cross section along the line 2-2 in FIG. 1. In FIG. 2, the surface of a fuel tank FT is made of a composite resin material containing polyethylene. In a tank upper wall FTa of the fuel tank FT, an attachment hole FTb is formed. The fuel cutoff valve 10 is installed on the tank upper wall FTa with its lower portion inserted into the attachment hole FTb. The fuel cutoff valve 10 comprises a casing 20, a float mechanism 50, and a spring 70 as major components. The casing 20 comprises a casing main body 30, a bottom member 35, and a cover 40. The space surrounded by the casing main body 30 and the bottom member 35 forms a valve chamber 30S. In the valve chamber 30S, the float mechanism 50 supported by the spring 70 is stored. The fuel cutoff valve 10 flows out fuel vapor from the fuel tank FT and prevents the liquid fuel flow to the canister when the liquid level rises up to a preset fluid level FL1 of the fuel tank at the time of refueling so as to enable the auto-stop function.

(2) Configuration of Each Portion of the Fuel Cutoff Valve 10

Figure 3:
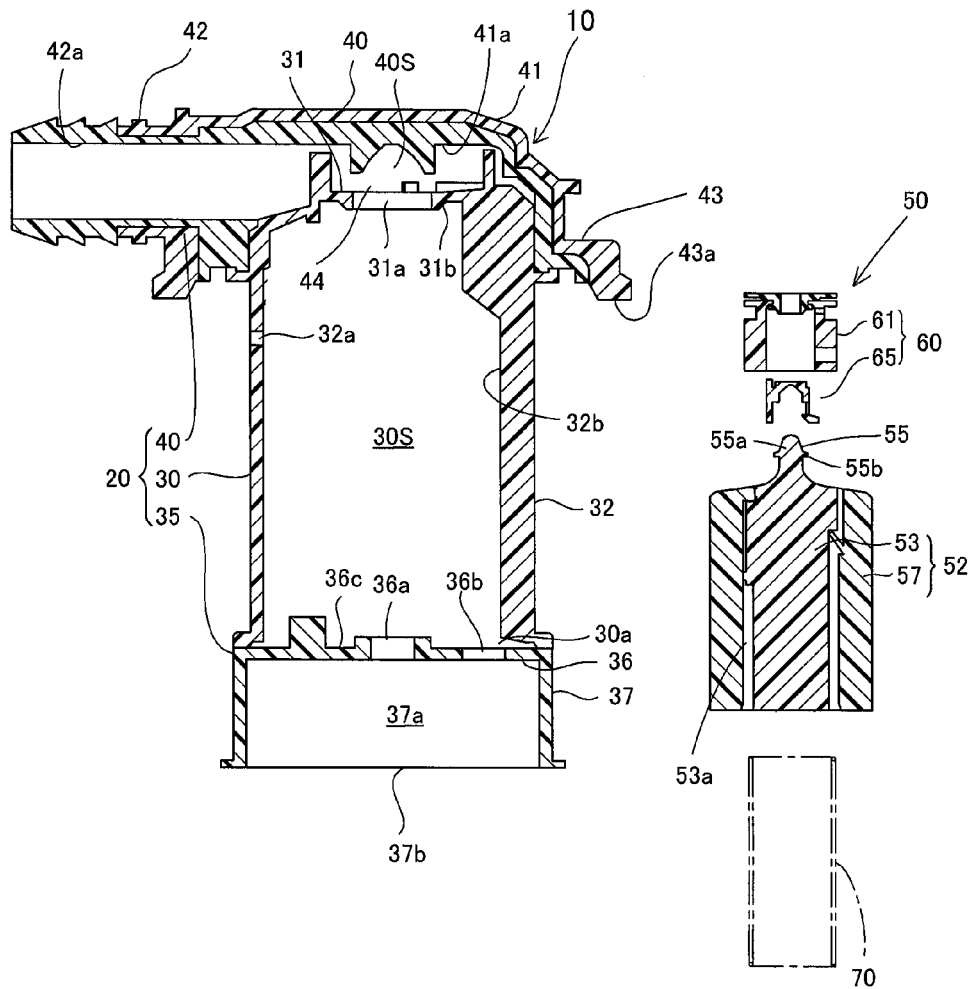
FIG. 3 is a disintegrated cross section of the fuel cutoff valve.

FIG. 3 is a disintegrated cross section of the fuel cutoff valve 10. The casing main body 30 comprises an upper wall 31 and a side wall 32 that is provided to protrude in a cylindrical form from the outer periphery of the upper wall 31 configuring a cup shape surrounded by the upper wall 31 and the side wall 32. The lower portion of the casing main body 30 has an opening 30a. At the center of the upper wall 31, a connecting hole 31a is formed penetrating therethrough. Along the periphery of the opening of the connecting hole 31a on the side of the valve chamber 30S is a seal part 31b. On the upper portion of the side wall 32, a communication hole 32a is formed connecting the inside of the fuel tank FT to the valve chamber 30S. Also, on the interior of the side wall 32, four to eight ribs 32b are provided along the periphery for guiding the float 52. The bottom member 35 is a member for partially closing the opening 30a of the casing main body 30 and for introducing fuel vapor and liquid fuel into the valve chamber 30S. The bottom member 35 comprises a bottom plate 36 and an introducing passage forming member 37 in a cylindrical form protruding from the outer periphery of the bottom plate 36, and integrally forms these components. The outer periphery of the bottom plate 36 is welded to the bottom end of the casing main body 30. On the bottom plate 36, communication holes 36a and 36b are formed. The communication holes 36a and 36b guide fuel vapor and liquid fuel in the fuel tank FT into the valve chamber 30S. Also, on the upper surface of the bottom plate 36, a spring support 36c is formed to support the bottom end of the spring 70. The introducing passage forming member 37 has an introducing passage 37a. The introducing passage 37a is a passage that guides fuel vapor and liquid fuel taken in from the opening 37b at the bottom into the valve chamber 30S via the communication holes 36a and 36b.

The cover 40 has a cover main body 41 and a tube member 42 protruding to one side from the center of the cover main body 41. The space surrounded by the upper portion of the casing main body 30 and the cover 40 is made to be a communication chamber 40S. The interior of the tube member 42 is made to be a pipe passage 42a with a circular cross section. One end of the pipe passage 42a is connected to the valve chamber 30S of the casing main body 30 via the connecting hole 31a, and the other end thereof is connected to the canister side (omitted in the figure). Along the outer periphery of the cover main body 41, a flange 43 is formed. The flange 43 is welded to the upper portion of the casing main body 30. The flange 43 is welded to the tank upper wall FTa of the fuel tank FT along an outer weld portion 43a.

Figure 4:
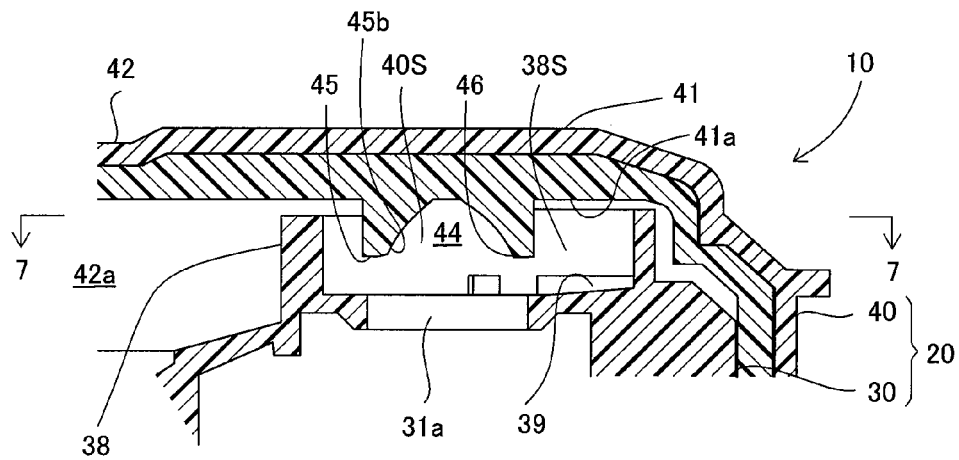
FIG. 4 is a cross section showing an upper portion of the fuel cutoff valve.

FIG. 4 is a cross section showing an upper portion of the fuel cutoff valve 10. Within the communication chamber 40S, a retaining chamber 38S and a connecting passage 44 are formed by members protruding from the upper portion of the casing main body 30 and the bottom surface of the upper wall of the cover main body 41. The retaining chamber 38S is a space for temporarily retaining fuel flown out of the connecting hole 31a. The connecting passage 44 is a passage that connects the connecting hole 31a to the pipe passage 42a.

Figure 5:
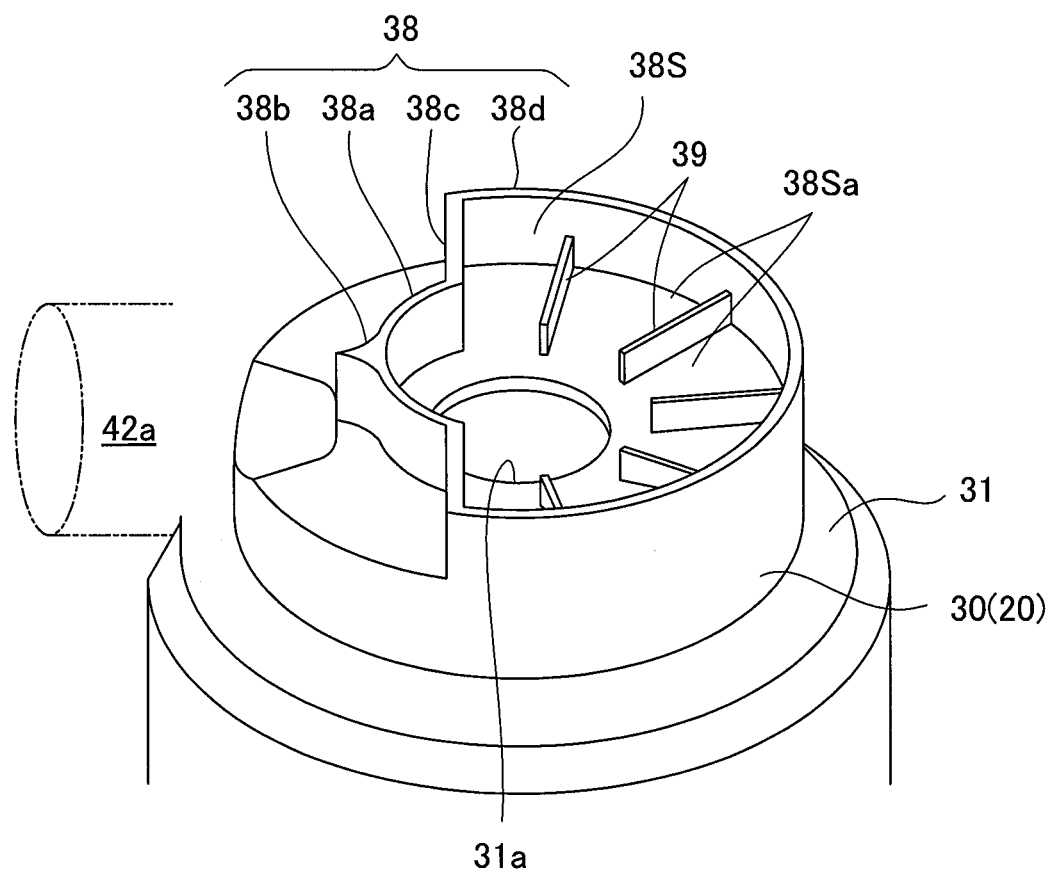
FIG. 5 is an axonometric view of an upper portion of the casing main body.
Figure 6:
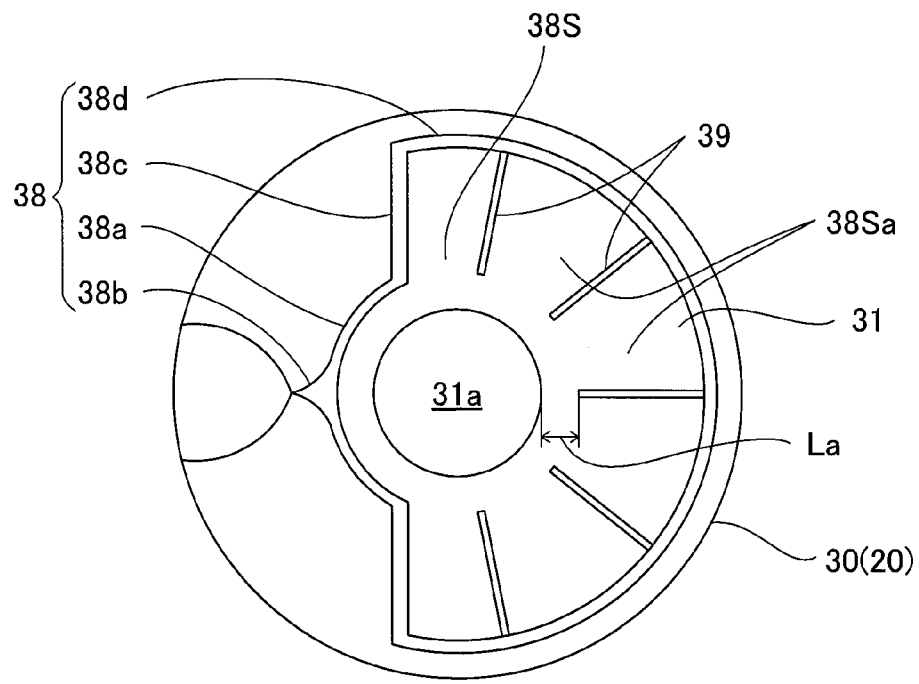
FIG. 6 is a plan of the casing main body.

FIG. 5 is an axonometric view of the upper portion of the casing main body 30, and FIG. 6 is a plan of the casing main body 30. The retaining chamber 38S is composed of a liquid closure member 38 provided to protrude from the upper surface of the upper wall of the casing main body 30. The liquid closure member 38 is formed by walls of the same height in the vertical direction surrounding the outer periphery of the connecting hole 31a. The liquid closure member 38 comprises an arc portion 38a, a guide piece 38b, a passage side partition wall 38c, and an outer side partition wall 38d. The arc portion 38a, located on the side of the pipe passage 42a, is formed to surround the range of approximately 120 degrees around the center of the connecting hole 31a. The guide piece 38b is formed in a pointed convex form from a joint of the arc portions 38a toward the pipe passage 42a. The passage side partition wall 38c is a wall formed to face the pipe passage 42a extending from each end of the arc portion 38a toward the outer periphery, blocking the fuel flow into the pipe passage 42a. The side partition wall 38d is a wall formed to extend from each end of the side partition wall 38c circling about halfway around the outer periphery of the upper wall 31.

Figure 7:
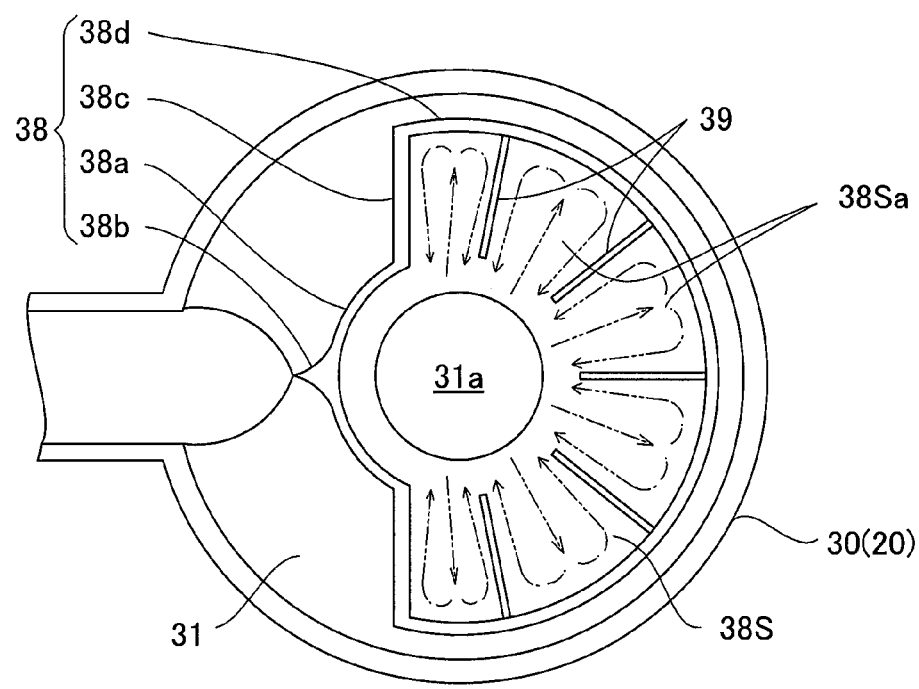
FIG. 7 shows action of the liquid closure member and the partition members.

On the upper surface of the upper wall 31 within the retaining chamber 38S, a plurality of partition members 39 are formed. Each partition member 39 is made in plurality (5 shown in the figure) in a form of a ridge (rib) radially extending from the near center of the connecting hole 31a. The outer edge of each partition member 39 is integrally connected to the outer side partition wall 38d of the liquid closure member 38. The partition member 39 divides the retaining chamber 38S into multiple divided chambers (6 shown in the figure). The direction of the partition member 39 may be figured out so as to direct the opening of each divided chamber 38Sa substantially toward the connecting hole 31a. The partition member 39 is provided to protrude from the upper surface of the upper wall 31 extending from a location a distance away from the periphery of the opening of the connecting hole 31a. The height of the partition member 39 is made lower than that of the liquid closure member 38. As shown in FIG. 7, the divided chamber 38Sa is a chamber for temporarily storing liquid fuel (two-dotted lines), when it leaks out of the connecting hole 31a, and for bringing it back to the fuel tank FT through the connecting hole 31a.

Figure 8:
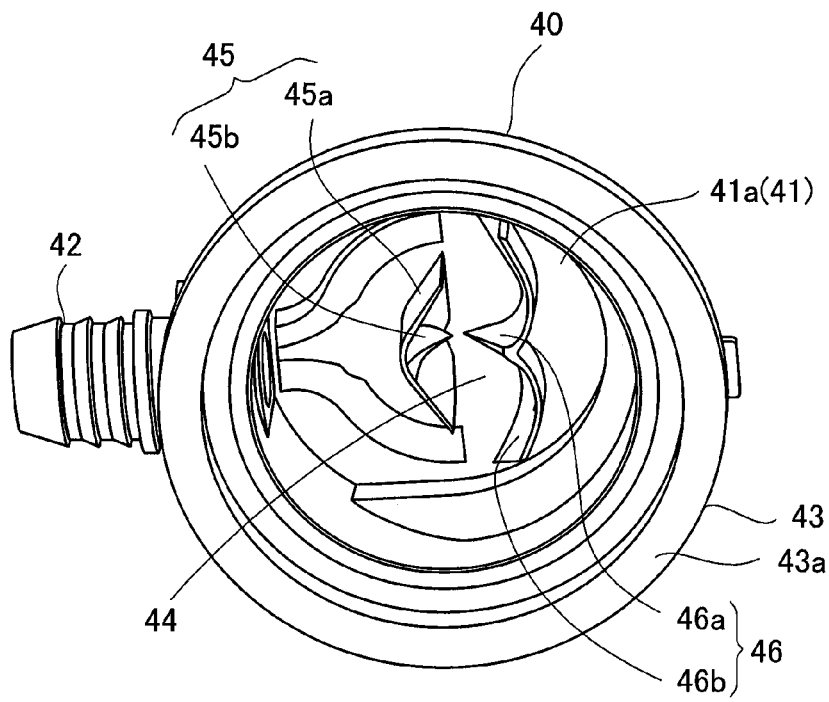
FIG. 8 is an axonometric view of the cover from below.
Figure 9:
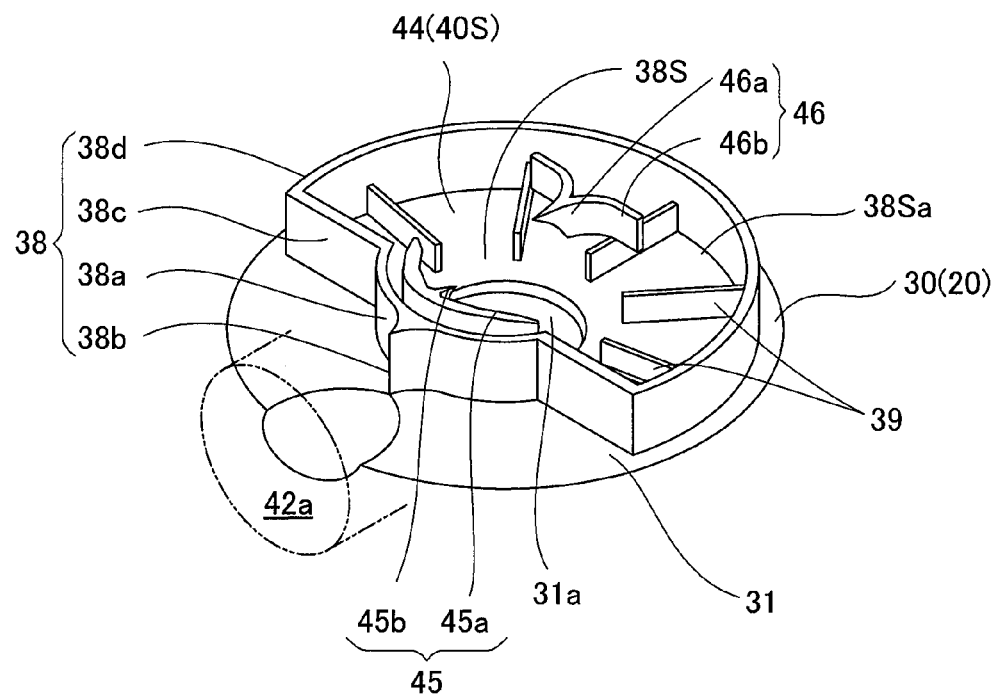
FIG. 9 shows the connecting passage formed in the communication chamber.

FIG. 8 is an axonometric view of the cover 40 from below, and FIG. 9 shows the connecting passage 44 formed in the communication chamber 40S. The connecting passage 44 comprises a front permeability guide member 45 and a back permeability guide member 46 formed by a cover inner wall 41a of the cover main body 41. The front permeability guide member 45 is provided with an arc wall 45a and a branch wall 45b. The back permeability guide member 46 is provided with a branch wall 46a and an arc portion 46b. The arc wall 45a is arranged so as to align with halfway around the periphery of the opening of the connecting hole 31a. The branch wall 45b is formed in an arc shape extending upward (see FIG. 4) and arranged so as to partially overlap the connecting hole 31a up above. The arc portion 46b is formed in a mound shape centered around the connecting hole 31a at a location opposite the front permeability guide member 45. The arc portion 46a is formed in an arc shape extending upward (see FIG. 4) and arranged so as to partially overlap the connecting hole 31a up above. The liquid closure member 38 is placed a distance away from the front permeability guide member 45 in the horizontal direction.

Figure 10:
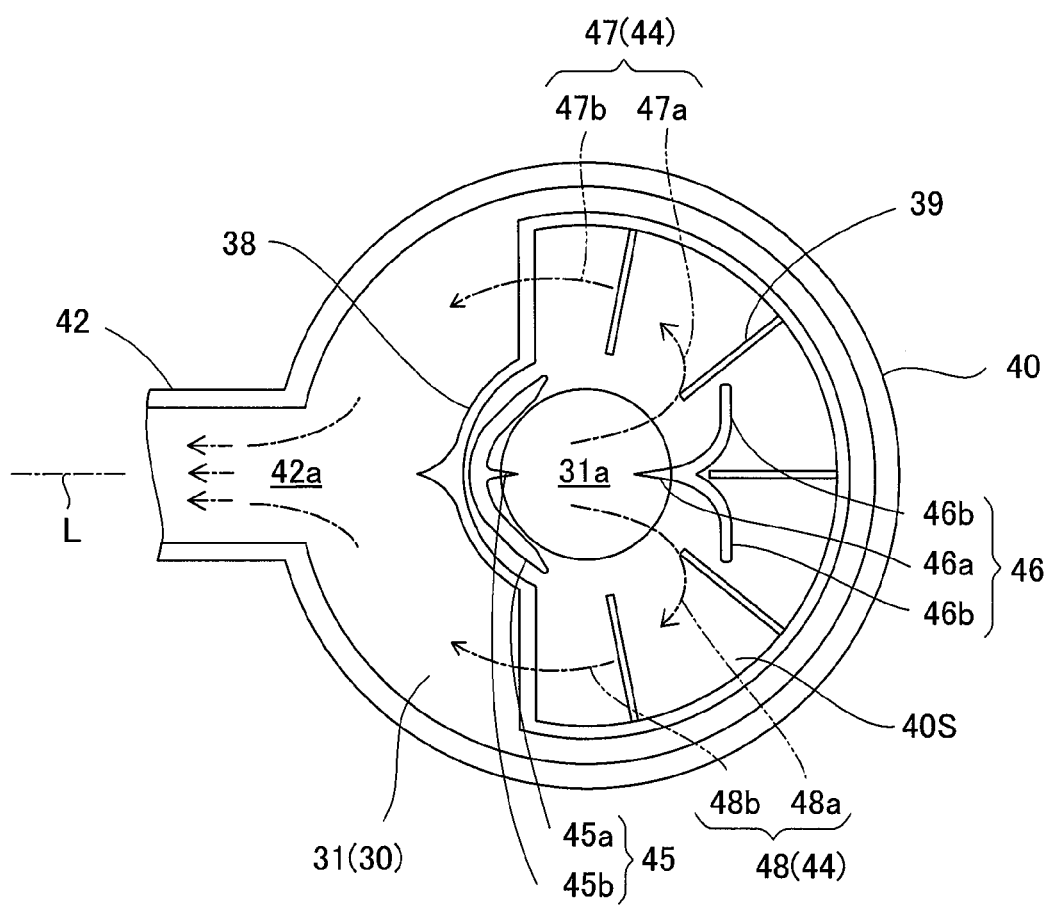
FIG. 10 shows gas flow from the connecting hole into the pipe passage.

As shown in FIG. 10, arrangement of the front permeability guide member 45 and the back permeability guide member 46 allows the connecting passage 44 to be configured as a branch passage composed of a first passage 47 and a second passage 48. The first and second passages 47, 48 are arranged symmetrically with respect to the line connecting the center of the connecting hole 31a to the axis L of the pipe passage 42a. The first passage 47 is composed of a branch passage 47a formed by the arc wall 45a of the front permeability guide member 45 and the arc portion 46b of the back permeability guide member 46, and a round passage 47b formed in a space between the upper end of the partition member 39 and the ceiling surface of the cover main body 41 (FIG. 8). The second passage 48, like the first passage 47, is composed of a branch passage 48a formed by the arc wall 45a of the front permeability guide member 45 and the arc portion 46b of the back permeability guide member 46, and a round passage 48b formed in a space between the upper portion of the partition member 39 and the ceiling surface of the cover main body 41 (FIG. 8). These round passages 47b, 48b merge into the pipe passage 42a. Also, the branch wall 45b of the front permeability guide member 45 and the arc portion 46b of the back permeability guide member 46 are formed in a ridge shape along the axis L above the connecting hole 31a so that gas flown out of the connecting hole 31a is easily divided into flows along the first and second passages 47, 48. Such configuration of the connecting passage 44 allows the fuel vapor flown out of the connecting hole 31a to branch out to the first passage 47 and the second passage 48 so as to flow into the pipe passage 42a.

As shown in FIG. 3, the float mechanism 50 has a double-tier valve structure with an improved valve opening property comprising the float 52 and an upper valve unit 60 arranged above the float 52. The float 52 is provided with a first float member 53 and the second float member 57 integrally assembled therein. Above the first float member 53, a valve support element 55 is provided to protrude out. The valve support element 55, a component supporting the upper valve unit 60 in a pivotal way, is provided with a support projection 55a which is a (convex) projection in an approximate form of a cone, and a ring shaped projection 55b is formed along the outer periphery of the valve support element 55 for latching the upper valve unit 60. In the gap between the outer periphery of the first float member 53 and the inner periphery of the second float member 57, a spring housing gap 53a is provided, and a spring 70 is arranged therein.

Figure 11:
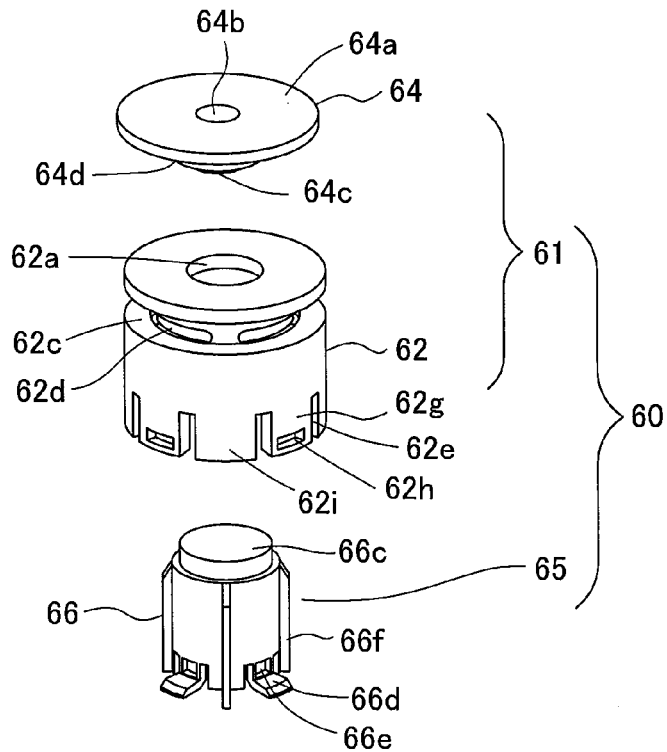
FIG. 11 is a disintegrated axonometric view of the first and second valve elements composing the upper valve unit.
Figure 12:
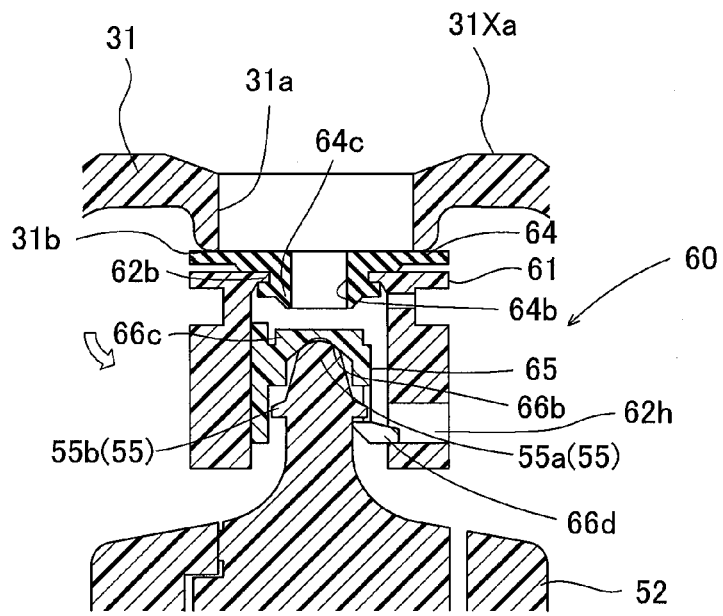
FIG. 12 is a cross section showing the upper valve unit.

The upper valve unit 60 opens and closes the connecting passage 44, while working as a valve for improving the valve opening property, and is supported by the valve support element 55 of the float 52 to allow up-down as well as pivotal movements. FIG. 11 is a disintegrated axonometric view of a first valve element 61 and a second valve element 65 composing the upper valve unit 60, and FIG. 12 is a cross section showing the upper valve unit 60. The first valve element 61 is provided with a first valve member 62 in an approximate form of a cylinder and a seat part material 64. Within the first valve member 62, a support end hole 62a is formed in the axial direction. In the upper portion of the first valve member 62, a fixation element 62b is formed for installing the seat part material 64. Also, along the outer periphery of the first valve member 62, a ring shaped depression 62c is formed, and vents 62d for connecting the support end hole 62a to the ring shaped depression 62c are formed at four locations. In the lower portion of the first valve member 62, slits 62e are formed whereby engagement pieces 62g are formed out of fastness splinters 62i in a way to allow elastic deformation. A fitting hole 62h is formed on each engagement piece 62g.

The seat part material 64 is provided with a first seat 64a, a first connection hole 64b connecting to the support end hole 62a, a seal part 64c formed at the bottom end of the first connection hole 64b, and a fixation element 64d, which are integrally formed therein by a rubber material. The seat part material 64 is mounted to the fixation element 62b of the first valve member 62 by the fixation element 64d, and the sealing capability is enhanced by the elastic deformation of the seal part 31b as it is seated by virtue of the gap between the first seat 64a and the upper surface of the first valve member 62.

In FIGS. 11 and 12, the second valve element 65 is provided with a second valve member 66 in a cylindrical form. On the second valve member 66, a holed bottom is formed opening downward. At the center of this holed bottom, a shaped support member 66b is formed in a concave shape. The shaped support member 66b is supported to allow pivotal movements of the second valve element 65 around the supporting point of the valve support element 55 by being placed on top of the valve support element 55 of the float 52. Also, on the upper surface of the second valve member 66, a second seat 66c is formed, which is made to open and close the first connection hole 64b by attaching and detaching to and from the seal part 64c of the first valve element 61. On the lower portion of the second valve member 66, latching tabs 66d are formed in four locations to support the first valve element 61 to allow up-down movements against the second valve element 65 by means of engaging themselves with the fitting holes 62h of the first valve member. On the upper portion of each latching tab, a fitting hole is formed, and the second valve element is supported and latched against the float 52 to allow up-down movements by means of engaging itself with the fitting hole 62h of the first valve member 62. Also, along the outer periphery of the second valve member 66, a guide rib 66f is formed for guiding the second valve element 65 in the vertical direction. The guide rib 66f is installed vertically protruding in a rib form at four locations at an equal interval on the side wall of the second valve member 66 and made to slide along the inner wall of the support end hole 62a. Also, the center of gravity of the upper valve unit 60 is set at a lower height than that of the shaped support member 66b. For the purpose of this configuration, the fastness splinter 62i is formed so as to increase the weight of the lower portion. Also, by making the valve support element 55 in a convex form and the shaped support member 62b in a concave form, the center alignment of the upper valve unit 60 with the float 52 is made easier, and further, the positioning of the upper valve unit 60 is made more stably because the center of gravity is easier to set at a lower height relative to the supporting point.

(3) Actions of the Fuel Cutoff Valve 10

Next, actions of the fuel cutoff valve 10 is explained below. As shown in FIG. 2, as fuel is supplied into the fuel tank FT by refueling, fuel vapor remaining in the upper portion of the fuel tank FT flows out from the introducing passage 37a of the bottom member 35 to a communication hole 35b into the valve chamber 30S as the fluid level within the fuel tank rises up. Further, fuel vapor is let out to the canister side through the valve chamber 30S, connecting hole 31a, connecting passage 44, and pipe passage 42a. Then, as the liquid level reaches a given level FL1 within the fuel tank FT, the internal pressure of the fuel tank FT rises due to the closure of an opening 37b by the refilled fuel. Under these conditions, the difference in pressure between the fuel tank and the valve chamber 30S gets increased to let the fuel flow into the valve chamber 30S via the communication holes 36a and 36b to lift up the fuel liquid level therein. When the fuel liquid level reaches a height h0, in the balance between the upward force caused by the buoyancy of the float 52 as well as the load of the spring 70 and the downward force caused by own weight of the float mechanism 50, the former surpasses the latter bringing up the float mechanism 50 in an integral way to let the seat part material 64 of the first valve element 61 be seated on the seal part 31b so as to close the connecting hole 31a. At this time, fuel builds up in an inlet pipe and enables the auto-stop function as it touches a refueling gun. This allows fuel vapor to escape from the fuel tank during refueling of the tank and prevents fuel from flowing out therefrom.

On the other hand, once fuel in the fuel tank FT is consumed to lower the liquid level, the float 52 drops down as its buoyancy decreases. The dropped float 52 brings down the second valve element 65 through the engagement between the latching tab 66d of the second valve element 65 and the ring shaped projection 55b of the float 52. This allows the second seat 66c to move away from the seal part 64c to open the first connection hole 64b. Due to the communication through the first connection hole 64b, the pressure in the lower portion of the first valve element becomes equal to that around the connecting passage 44. Since the latching tab 66d is engaged with the fitting hole 62h, the first valve element 61 is brought down via the second valve element 65. Then, the dropped first valve element 61 allows the seat part material 64 to move away from the seal part 31b to open the connecting passage 44. Thus, by setting the passage area of the first connection hole 64b smaller than that of the connecting hole 31a, the upper valve unit 60 opens with a minimum force, thus acting to promote improvements to the valve opening property.

(4) Actions and Effects of Embodiments

The configuration of the embodiment described above exerts the following effects:

(4)-1: In FIG. 2, once liquid fuel leaks out of the connecting hole 31a due to undulation of fuel or delayed action of the float mechanism 50 caused by refueling or pitching back and forth of the vehicle, the leaked fuel is guided into the divided chamber 38Sa formed by the liquid closure member 38. In this case, since the retaining chamber 38S is divided by the partition members 39, the leaked liquid fuel is guided from the connecting hole 31a into the divided chamber 38Sa divided by the partition members 39. Liquid fuel in the divided chamber 38Sa, when affected by centrifugal force and vibration caused by rolling of the vehicle, reduces its flowing speed by hitting the partition members 39 and the outer side partition wall 38d to decrease the flowing force toward the pipe passage 42a. In addition, since the peripheral portion of the partition member 39 is connected to the outer side partition wall 38d, liquid fuel does not get guided into the pipe passage 42a along the wall surface of the outer side partition wall 38d. Therefore, liquid fuel remains in the divided chamber 38Sa and is less likely to flow out via the pipe passage 42a. Then, liquid fuel in the divided chamber 38Sa is guided to the connecting hole 31a along the partition member 39 due to the recovery from the inclined position or vibration of the vehicle, and brought back to the fuel tank via the valve chamber 30S. Therefore, even when undulation of fuel or delayed action of the float mechanism 50 occurs caused by refueling or inclination and vibration of the vehicle, it is possible to prevent liquid fuel flown out of the connecting hole 31a from flowing to the canister via the pipe passage 42a.

(4)-2: As shown in FIG. 7, since the partition member 39 is arranged radially extending from the center of the connecting hole 31a and the opening of each divided chamber 38Sa faces the connecting hole 31a, liquid fuel in the divided chamber 38Sa can quickly return to the connecting hole 31a no matter which direction the vehicle vibrates.

(4)-3: As shown in FIGS. 4 and 9, since the partition member 39 is formed at a lower height in the vertical direction than the liquid closure member 38, and part of the communication chamber 40S is configured to let gas flow between the connecting hole 31a and the pipe passage 42a, the flow is directed toward the pipe passage 42a via the communication chamber 40S above the partition member 39. Therefore, gas flown from the connecting hole 31a quickly flows into the pipe passage without sustaining significant pressure loss caused by the partition member 39.

(4)-4: As shown in FIG. 6, since the partition member 39 is provided to protrude from the upper surface of the upper wall 31 at a location a distance La away from the periphery of the opening of the connecting hole 31a in the radial direction, it is possible to let gas flow quickly to the pipe passage 42a without generating significant turbulence.

(4)-5: As shown in FIG. 9, since the liquid closure member 38 is provided with the arc portion 38a formed to partially surround the periphery of the opening of the connecting hole 31a and forms a passage in an arc form toward the pipe passage 42a, it is possible to let gas flow quickly to the pipe passage 42a without sustaining significant pressure loss. Also, since the passage side partition wall 38c is formed to face the tube member 42, it is possible to surely prevent fuel from flowing into the pipe passage 42*a*.

(4)-6: Gas flown out of the connecting hole 31*a* is blocked its flow toward the pipe passage 42*a* by the front permeability guide member 45 to divert to the other side of the pipe passage 42*a* and is guided by the branch wall 46*a* of the back permeability guide member 46 arranged on the opposite side into the first passage 47 as well as the branch passage 47*a*, 48*a* of the second passage 48 and further goes through the round passage 47*b*, 48*b* arranged above the liquid closure member 38 so as to converge into the pipe passage 42*a*. Therefore, the branch wall 46*a* of the back permeability guide member 46 lets the gas flow from the connecting hole 31*a* branch out to the first passage and the second passage 48 of the connecting passage 44 to bring it quickly into the pipe passage 42*a*, thus enabling to reduce the pressure loss.

Figure 13:
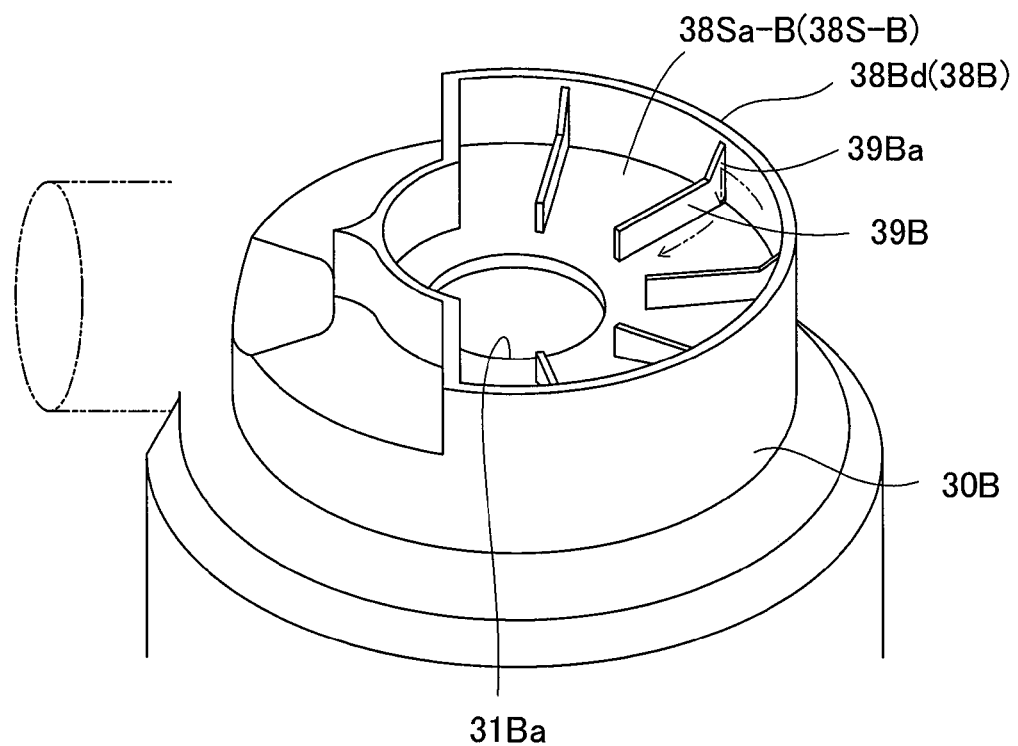
FIG. 13 is an axonometric view showing an upper portion of the casing main body according to another embodiment.

Meanwhile, the present invention is not limited to the embodiment described above, but is implementable in various aspects within a range not to deviate from the scope thereof, and the following variation is also possible:

FIG. 13 is an axonometric view showing an upper portion of the casing main body 30B according to another embodiment. This embodiment is characterized by the structure having a liquid flow prevention portion 39Ba. In other words, at the joint where the outer edge of a partition member 39B is connected to an outer side partition wall 38Bd, the liquid flow prevention portion 39Ba is formed. The shape of the liquid flow prevention portion 39Ba is a right triangle having a slope going up from a connecting hole 31Ba toward the outer side partition wall 38Bd. That is, the height of the liquid flow prevention portion 39Ba at the joint is made gradually greater than that of other portions of the partition member 39B except for the liquid flow prevention portion 39Ba. The liquid flow prevention portion 39Ba blocks the liquid fuel flow along the upper portion of the outer side partition wall 38Bd to guide it into a divided chamber 38Sa-B and quickly brings it back to the fuel tank therefrom via the connecting hole 31Ba when the fuel cutoff valve 10 is tilted. Meanwhile, the shape of the liquid flow prevention portion 39Ba may be a triangle having a slope like the one in the embodiment described above, or a form with a curved surface, or even a quadrangle.

The liquid closure member 38 and the partition member 39 according to the embodiment described above can adopt various shapes and heights as long as they do not impair the effects of the present invention with due consideration for preventing liquid fuel from flowing toward the pipe passage 42*a* and reducing the loss of pressure applied thereto.

The flow passage structure in the tank described above was used for a fill-up regulating valve that closes a connection hole during refueling when the fluid level reaches full, but instead, it can be used for a rollover valve that prevents the fuel from flowing out of the fuel tank FT when the vehicle is tilted, for example.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve that opens and closes a passage connecting an interior and exterior of a fuel tank, the fuel cutoff valve comprising;
   a casing main body that has an upper wall, a side wall projecting cylindrically and downwardly from an outer periphery of the upper wall, a valve chamber surrounded by the upper wall and the side wall and connected to the interior of the fuel tank, and a connecting hole formed in the wall and connected to the valve chamber,
   a cover that has a cover main body forming a communication chamber connected to the connecting hole by being fixed to an upper portion of the casing main body, and a tube member projecting from the cover main body with a pipe passage for connecting the exterior and the communication chamber, and
   a float that is housed in the valve chamber that opens and closes the connecting hole by moving up and down following a fuel liquid level within the fuel tank,
   wherein the casing main body includes;
   a liquid closure member that projects upwardly from the upper wall in the communication chamber to surround all around the connecting hole, the liquid closure member being configured to form a retaining chamber for temporarily retaining liquid fuel flown out of the connecting hole, and
   partition members that projects from the upper wall in the retaining chamber, wherein each of the partition member is arranged radially extending outward from a periphery of the connecting hole and to divide the retaining chamber into a plurality of divided chambers, and each opening of the divided chambers is configured to be arranged facing to the connecting hole.

2. The fuel cutoff valve in accordance with claim 1, wherein
   an outer periphery of the partition member is connected to the liquid closure member.

3. The fuel cutoff valve in accordance with claim 2, wherein
   the partition members are formed such that the height of the partition member is lower than that of the liquid closure member in the vertical direction wherein an upper space of the partition members forms a part of the communication chamber for flowing vapor between the connecting hole and the pipe passage.

4. The fuel cutoff valve in accordance with claim 3, wherein
   the partition members project from a location away from a periphery of the connecting hole in the radial direction.

5. The fuel cutoff valve in accordance with claim 4, wherein
   the liquid closure member includes;
   an arc portion that is formed to partially surround the periphery of the connecting hole facing the pipe passage,
   an outer side partition wall that is formed to partially surround the periphery of the connecting hole except for a location of the arc portion and has a diameter greater than that of the arc portions, and
   a passage side partition wall that is formed facing the pipe passage and connects each end of the arc portion to the outer side partition wall.

6. The fuel cutoff valve in accordance with claim 5, wherein
   the partition member includes a liquid flow prevention portion that is formed at a location to connect an outer end of the partition member to the outer side partition wall for blocking the liquid fuel flow along the outer side partition wall, wherein the height of the upper end of the liquid flow prevention portion is formed higher than that of the upper end of the partition member.

7. The fuel cutoff valve in accordance with claim 2, wherein
the partition member includes a liquid flow prevention portion that is formed at a location to connect an outer end of the partition member to the outer side partition wall for blocking the liquid fuel flow along the outer side partition wall, wherein a height of the upper end of the liquid flow prevention portion is formed higher than that of the upper end of the partition member.

8. The fuel cutoff valve in accordance with claim 1, wherein
the partition members are formed such that the height of the partition member is lower than that of the liquid closure member in the vertical direction wherein an upper space of the partition members forms a part of the communication chamber for flowing vapor between the connecting hole and the pipe passage.

9. The fuel cutoff valve in accordance with claim 8, wherein
the partition members project from a location away from a periphery of the connecting hole in the radial direction.

10. The fuel cutoff valve in accordance with claim 9, wherein
the liquid closure member includes;
an arc portion that is formed to partially surround the periphery of the connecting hole facing the pipe passage,
an outer side partition wall that is formed to partially surround the periphery of the connecting hole except a location of the arc portion and has a diameter greater than that of the arc portions, and
a passage side partition wall that is formed facing the pipe passage and connects each end of the arc portion to the outer side partition wall.

11. The fuel cutoff valve in accordance with claim 1, wherein
the liquid closure member includes;
an arc portion that is formed to partially surround the periphery of the connecting hole facing the pipe passage,
an outer side partition wall that is formed to partially surround the periphery of the connecting hole except a location of the arc portion and has a diameter greater than that of the arc portions, and
a passage side partition wall that is formed facing the pipe passage and connects each end of the arc portion to the outer side partition wall.

12. The fuel cutoff valve in accordance with claim 1, wherein
the partition member includes a liquid flow prevention portion that is formed at a location to connect an outer end of the partition member to the outer side partition wall for blocking the liquid fuel flow along the outer side partition wall, wherein a height of the upper end of the liquid flow prevention portion is formed higher than that of the upper end of the partition member.

* * * * *